US010253764B2

(12) United States Patent
Shen et al.

(10) Patent No.: US 10,253,764 B2
(45) Date of Patent: Apr. 9, 2019

(54) TWO-WAY WOBBLE PLATE COMPRESSOR

(71) Applicant: BITZER Refrigeration Technology (China) Co., Ltd., Beijing (CN)

(72) Inventors: Dazi Shen, Beijing (CN); Jian Wang, Beijing (CN); Yujun Chen, Beijing (CN)

(73) Assignee: BITZER Refrigeration Technology (China) Co., Ltd., Beijing (CN)

(*) Notice: Subject to any disclaimer, the term of this patent is extended or adjusted under 35 U.S.C. 154(b) by 90 days.

(21) Appl. No.: 15/312,489

(22) PCT Filed: May 21, 2015

(86) PCT No.: PCT/CN2015/079445
§ 371 (c)(1),
(2) Date: Nov. 18, 2016

(87) PCT Pub. No.: WO2015/176667
PCT Pub. Date: Nov. 26, 2015

(65) Prior Publication Data
US 2017/0096992 A1 Apr. 6, 2017

(30) Foreign Application Priority Data
May 21, 2014 (CN) .......................... 2014 1 0215871

(51) Int. Cl.
F04B 39/00 (2006.01)
F04B 27/10 (2006.01)
(Continued)

(52) U.S. Cl.
CPC .......... F04B 39/0005 (2013.01); F04B 27/10 (2013.01); F04B 27/1063 (2013.01);
(Continued)

(58) Field of Classification Search
CPC .. F01B 3/02; F02B 75/26; F04B 1/128; F04B 27/1063; F16H 23/04; F16H 23/08
See application file for complete search history.

(56) References Cited

U.S. PATENT DOCUMENTS 1,956,944 A * 5/1934 Coombs .................. F16H 23/04
74/60
1,978,762 A * 10/1934 Reagan ................... F16H 23/04
74/60

(Continued)

FOREIGN PATENT DOCUMENTS

CN 1141393 A 1/1997
CN 1199144 A 11/1998
(Continued)

Primary Examiner — Michael Leslie
Assistant Examiner — Matthew Wiblin
(74) Attorney, Agent, or Firm — Reinhart Boerner Van Deuren P.C.

(57) ABSTRACT

A two-way wobble plate compressor, comprising: a cylinder block (100); a two-way piston (200) capable of reciprocating within a cylinder bore (110) of the cylinder block (100); a drive shaft (310) driving the two-way piston (200); a bearing unit, including a plurality of contact balls and an inner ring and an outer ring fitting with the plurality of contact balls, and having a central plane (P-P) angled to a perpendicular plane (I-I) of the drive shaft; wherein said drive shaft (310) is sleeved in the inner ring of the bearing unit, and is fixed to the inner ring; the outer ring of said bearing unit is coupled to the two-way piston, and when the drive shaft rotates, the two-way piston is driven via the bearing unit to perform reciprocating motion. The two-way wobble plate compressor of the present invention has a compact design, and may significantly reduce friction loss.

4 Claims, 4 Drawing Sheets

(51) Int. Cl.
*F04B 27/12* (2006.01)
*F04B 39/12* (2006.01)
*F16C 19/18* (2006.01)

(52) U.S. Cl.
CPC ............ *F04B 27/12* (2013.01); *F04B 39/122* (2013.01); *F16C 19/184* (2013.01); *F16C 2240/34* (2013.01); *F16C 2360/42* (2013.01)

(56) References Cited

U.S. PATENT DOCUMENTS

| | | | | |
|---|---|---|---|---|
| 2,112,934 | A | * | 4/1938 | Stinnes .................... F16H 23/04 |
| | | | | 123/51 AC |
| 2,335,415 | A | * | 11/1943 | Holmes ................... F16H 23/04 |
| | | | | 74/60 |
| 2,387,908 | A | * | 10/1945 | Howard ................... F16H 23/08 |
| | | | | 123/56.5 |
| 4,765,194 | A | * | 8/1988 | Van Meegen ............ F01B 3/02 |
| | | | | 417/269 |
| 5,009,574 | A | | 4/1991 | Ikeda et al. |
| 5,027,755 | A | * | 7/1991 | Henry, Jr. .............. F01B 3/0002 |
| | | | | 123/56.4 |
| 5,027,756 | A | * | 7/1991 | Shaffer .................... F02B 75/26 |
| | | | | 123/197.1 |
| 5,239,913 | A | | 8/1993 | Terauchi |
| 7,331,271 | B2 | * | 2/2008 | Sanderson .............. F01B 3/106 |
| | | | | 92/12.2 |
| 2004/0173089 | A1 | * | 9/2004 | Gray, Jr. ................. F04B 1/124 |
| | | | | 91/505 |
| 2009/0101089 | A1 | * | 4/2009 | Stephens ................. F02B 75/26 |
| | | | | 123/56.3 |
| 2010/0132354 | A1 | * | 6/2010 | Fanner .................. F01B 3/0002 |
| | | | | 60/525 |
| 2014/0028147 | A1 | * | 1/2014 | Murray .................... H02K 1/24 |
| | | | | 310/216.074 |

FOREIGN PATENT DOCUMENTS

| | | |
|---|---|---|
| CN | 2787875 Y | 6/2006 |
| CN | 1878955 A | 12/2006 |
| CN | 101012819 A | 8/2007 |
| CN | 101598121 | 12/2009 |
| CN | 204099154 U | 1/2015 |
| JP | 2009068466 A | 4/2009 |

\* cited by examiner

TWO-WAY WOBBLE PLATE COMPRESSOR

TECHNICAL FIELD

The present invention relates to a wobble plate compressor having a two-way piston.

BACKGROUND ART

Traditional compressors include swash plate compressors. Usually, a swash plate type compressor includes a drive shaft, a swash plate connected together with the drive shaft, and several pistons operatively connected with the swash plate. When a drive unit drives the drive shaft to rotate in a well-known manner, the swash plate will bring each piston within cylinders into reciprocating motion.

For example, U.S. Pat. No. 5,009,574 discloses a traditional swash plate compressor, in the structure of which a swash plate is fixedly integrated on a drive shaft, such that the swash plate rotates together with the drive shaft. In other words, the swash plate does not rotate relative to the drive shaft. During the operation of a traditional swash plate compressor, the piston simply performs reciprocating motion. In such a structure, it further includes a sliding shoe, through which the swash plate drives the piston into reciprocating motion. Since the swash plate rotates together with the drive shaft, it causes high speed sliding motion between each sliding shoe and the swash plate.

The characteristic high speed sliding motion between the sliding shoe and the swash plate within the swash plate compressor may result in high friction loss and low loading capacity, and particularly, the circumstances become more serious in large volume compressors. Thus, as an improvement to swash plate compressors, wobble plate compressors in the prior art disengage the motion of the swash plate from the drive shaft, trying to reduce the above described friction loss.

For example, U.S. Pat. No. 2,335,415 discloses a wobble plate compressor structure, and in this structure, a wobble plate is connected to a hub of a drive shaft via an anti-friction bearing, such that the wobble plate performs wobbling motion without rotating together with the drive shaft; in other words, there is only slight sliding motion between the wobble plate and the sliding shoe, and sliding friction with high speed motion between the traditional swash plate and the sliding shoe has been replaced by rolling friction of the bearing. However, the structure reduces friction loss, but it is not compact enough, and lacks industrial applicability.

U.S. Pat. No. 5,239,913 discloses another typical wobble plate compressor structure. In this structure, a force from a top of the piston is directed to a bearing via a connecting rod and the wobble plate; for compressors using a single-way piston, such a wobble plate structure is conventionally usable, however, for larger volume compressors requiring a two-way piston, this structure is obviously not suitable, because there is totally no sufficient space for mounting the bearing and the connecting rod at a same position.

In addition, in this and similar structures, the wobble plate is connected with each piston via a piston rod. Thus, in this piece of prior art, it essentially requires a wobble plate stopper to stop the wobble plate from rotating, which makes the compressor structure complicated, resulting in a uneven or unbalanced, complicated manner of rotation, which in turn produces vibrations and noises.

Thus, a novel wobble plate compressor structure is needed, which may, at the same time of maintaining its applicable range, reduce friction loss, improve energy conversion efficiency, and meanwhile overcome the above described problems of existing wobble plate structures.

SUMMARY OF THE INVENTION

An object of the present invention is to overcome the above described disadvantages of the existing wobble plate compressor structures, thereby providing a novel wobble plate compressor structure with low friction loss, and improved energy conversion ratio.

In order to achieve the above described object, a two-way wobble plate compressor of the present invention is provided, comprising:

a cylinder block, the cylinder block having a cylinder bore;

a two-way piston capable of reciprocating within the cylinder bore of the cylinder block;

a drive shaft driving the two-way piston;

particularly, the two-way wobble plate compressor further includes a bearing unit, the bearing unit including a plurality of contact balls and an inner ring and an outer ring fitting with the plurality of contact balls, and the bearing unit having a central plane angled to a perpendicular plane of the drive shaft, wherein said drive shaft is sleeved in the inner ring of the bearing unit, and is fixed to the inner ring;

the outer ring of said bearing unit is coupled to the two-way piston, and when the drive shaft rotates, the two-way piston is driven via the bearing unit to perform reciprocating motion.

Preferably, said bearing unit is a double row angular contact ball bearing unit.

Preferably, a bearing contact angle of said bearing unit is greater than 45°.

Preferably, said outer ring includes a coupling end, said coupling end including a first peripheral portion and a second peripheral portion; said two-way piston includes two socket portions, wherein two hemispherical sliding shoes are provided within the two socket portions for interacting with the first peripheral portion and the second peripheral portion of said coupling end, respectively.

Alternatively, said outer ring is fixedly connected with a drive pin; at its center, said two-way piston is provided with a cylindrical hole, an axis of the cylindrical hole being perpendicular to and intersecting with an axis of the two-way piston, and the cylindrical hole being provided with a slot fitting with the drive pin; and a piston pin is provided in the cylindrical hole, the piston pin having a cross hole, the piston pin passing through the slot to insert into the cross hole. Said inner ring is fastened to said drive shaft via a nut.

As compared with the prior art, the wobble plate compressor of the present invention is of a compact structure with low design complexity, which improves efficiency and output power, and at the same time, cost can be successfully controlled, so it is suitable for application in commercial compressors.

DETAILED DESCRIPTION OF THE EMBODIMENTS

With reference to particular embodiments and corresponding drawings, the structure composition and the operating principles of a two-way wobble plate compressor of the present invention will be described in detail in the following.

Generally speaking, in one aspect of the present invention, the two-way wobble plate compressor adopts a two-way piston structure, which uses a wobble plate to drive a two-way piston to reciprocate, and motion of the wobble plate is driven by a rotor fixed on a drive shaft. The present invention is particularly characterized by the manner of fitting between the wobble plate and the rotor. Bearing(s) may be fit between the wobble plate and the rotor so as to form a combined bearing unit; in other words, in addition to operating to drive the two-way piston into motion, the wobble plate may also directly serve as the outer ring of the combined bearing unit; and in addition to operating to drive the wobble plate into wobbling motion, the rotor mounted on drive shaft may also directly serve as the inner ring of the combined bearing unit. As such, high speed sliding motion in traditional swash plate compressors is replaced by rolling motion of the combined bearing unit; and meanwhile, as compared with the prior art, the wobble plate compressor of the present invention is of a compact structure with low design complexity, which improves efficiency and output power, and at the same time, cost can be successfully controlled, so it is suitable for application in commercial compressors.

In another aspect of the present invention, the bearing unit may directly serve as a drive mechanism of the two-way wobble plate compressor, the outer ring of the bearing unit may serve as the wobble plate per se of the compressor, and the inner ring of the bearing unit may serve as the rotor per se of the compressor; as such, at the same time when friction loss is reduced, it may also realize a compact design of the overall compressor structure, and reduce cost.

Figure 1:
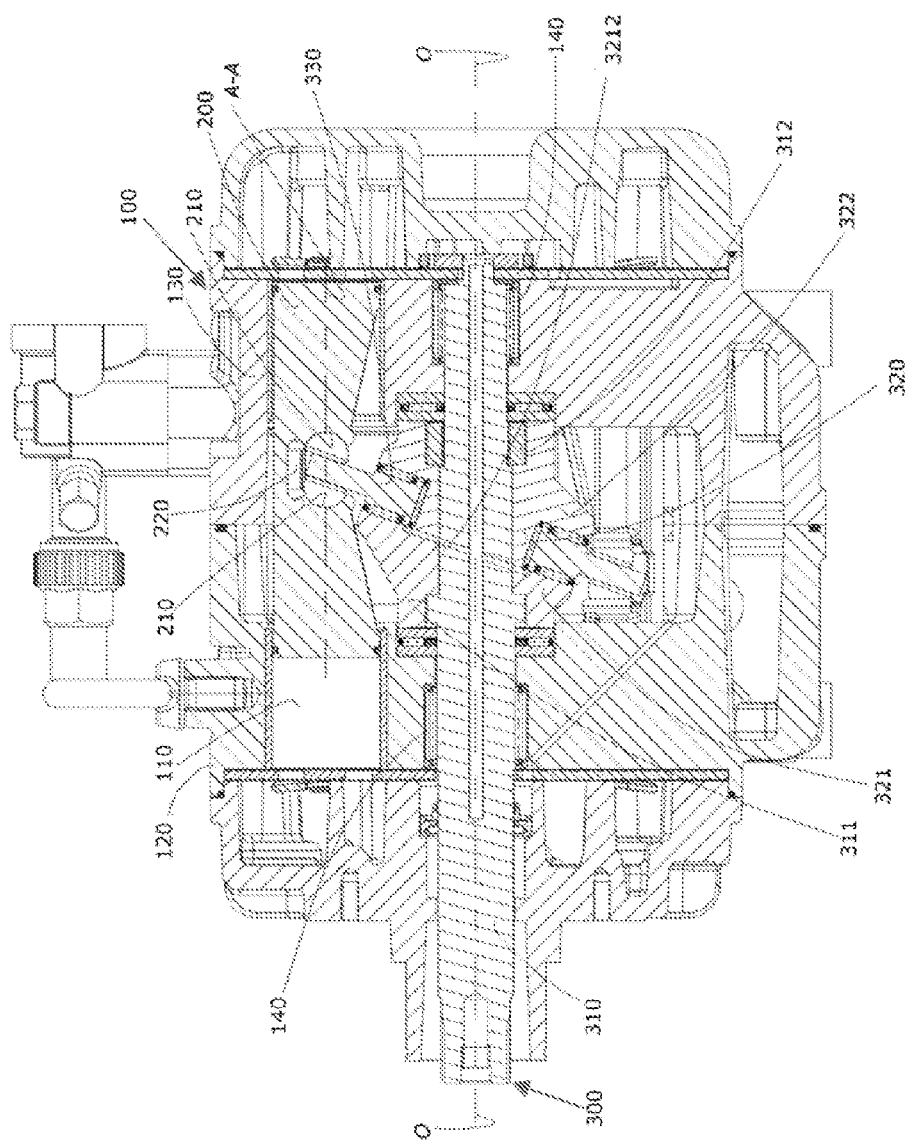
FIG. 1 is a sectional view of an embodiment of a two-way wobble plate compressor of the present invention.

Specifically, in FIG. 1, an illustrative view of an embodiment of a two-way wobble plate compressor of the present invention is shown.

With reference to the drawing, in this embodiment, the two-way wobble plate compressor includes a cylinder block 100, the cylinder block having several cylinder bores 110. Conventionally, the cylinder block 100 consists of a front cylinder block 120 and a rear cylinder block 130, and includes a pair of central holes 140 along a longitudinal axis O-O of the cylinder block; and the cylinder bores 110 are evenly arranged around the central hole 140.

The two-way wobble plate compressor further includes several two-way pistons 200 capable of reciprocating in the cylinder bores 110 of the cylinder block 100. The two-way pistons 200 perform reciprocating motion in relevant cylinder bores 110 of the front cylinder block 120 and the rear cylinder block 130.

Figure 2:
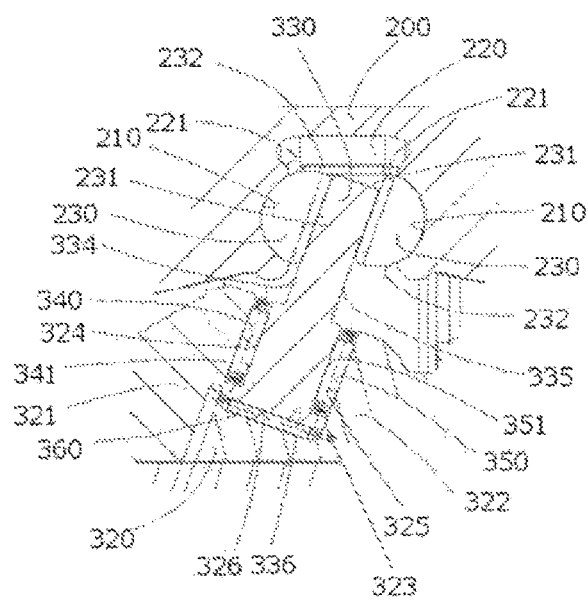
FIG. 2 is a partially enlarged illustrative view of the embodiment of FIG. 1.
Figure 3:
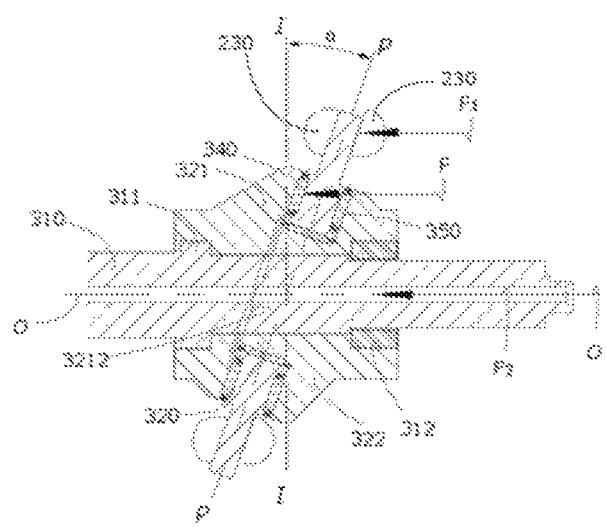
FIG. 3 is another partially enlarged illustrative view of the embodiment of FIG. 1.

The two-way wobble plate compressor further includes a drive assembly 300 driving the two-way pistons 200, the drive assembly 300 including a drive shaft 310, a rotor 320 fixedly connected with the drive shaft 310, and an annular wobble plate 330 fitting with the rotor 320; and further with reference to FIGS. 2 and 3, the rotor 320 has a central plane P-P angled to a perpendicular plane I-I of the drive shaft 310 at an angle of α, the central plane of the wobble plate 330 is coincident with the central plane P-P of the rotor 320, and when the drive shaft 310 rotates, the rotor 320 drives the two-way piston 200 into reciprocating motion via the wobble plate 330.

Conventionally, the drive shaft 310 is rotatably arranged the central hole 140 of the front cylinder block 120 and the rear cylinder block 130, and may be driven into rotation by an external driving force. The rotor 320 is fixedly connected with and integrated on the drive shaft, so it may rotate along with the rotation of the drive shaft 310. Further, with reference to FIGS. 2 and 3, the rotor 320 may conventionally consist of a first annular flange 321 and a second annular flange 322. The first annular flange 321 may be fixed on a boss 311 of the drive shaft 310, and similarly, the second annular flange 322 may be fixed to an engaging surface 3212 of the first annular flange 321 and the drive shaft 310; and the first annular flange 321 and the second annular flange 322 are fastened together via a nut 312 and the drive shaft 310, thereby realizing a fixed connection of the rotor 320 and the drive shaft 310. Of course, in an embodiment of the present invention, the fixed connection of the rotor 320 and the drive shaft 310 may also be implemented in other well known manners.

As described above, the central plane P-P of the rotor 320 and the perpendicular plane I-I of the drive shaft 310 form an included angle α. The included angle determines a stroke length when the two-way piston 200 performs reciprocating motion.

Particularly, with reference to FIGS. 2 and 3, the rotor 320 has an inner surface 323 for fitting with the wobble plate 330; in the embodiment, two inner surfaces 323 are provided between the first annular flange 321 and the second annular flange 322. The inner surface 323 include a first inner surface 324 and a second inner surface 325, which are oppositely arranged, and a rotor contact surface 326 arranged between the first inner surface 324 and the second inner surface 325.

The wobble plate 330 is partially encircled within the inner surface 323 of the rotor 320, and includes respectively a first peripheral portion 334 adjacent to the first inner surface 324, a second peripheral portion 335 adjacent to the second inner surface 325 and opposite to the first peripheral portion 334, and a wobble plate contact surface 336 adjacent to the rotor 320 contact surface and arranged between the first peripheral portion 334 and the second peripheral portion 335.

As a most prominent feature of the present invention, a first bearing 340 is provided between the first inner surface 324 and the first peripheral portion 334; a second bearing 350 is provided between the second inner surface 325 and the second peripheral portion 335; and a third bearing 360 is provided between the rotor contact surface 326 and the wobble plate contact surface 336.

As shown in FIGS. 1, 2, and 3, in an embodiment of the present invention, the first bearing 340 directly acts on the first inner surface 324 and the first peripheral portion 334; the second bearing 350 directly acts on the second inner surface 325 and the second peripheral portion 335; and the third bearing 360 directly acts on the rotor contact surface 326 and the wobble plate contact surface 336. In other words, for the first bearing 340, its outer ring contact surface 341 and the first peripheral portion 334 of the wobble plate 330 coincide, and its inner ring contact surface and the first inner surface 324 of the rotor 320 inner surface 323 coincide; for the second bearing 350, its outer ring contact surface 351 and the second peripheral portion 335 of the wobble plate 330 coincide, and its inner ring contact surface and the second inner surface 325 of the rotor 320 inner surface 323 coincide; and for the third bearing 360, its outer ring contact surface and the wobble plate contact surface 336 of the wobble plate 330 coincide, and its inner ring contact surface and the rotor contact surface 326 of the rotor 320 inner surface 323 coincide.

With reference to FIGS. 1, 2, and 3, traditional sliding shoe fitting structure may be adopted for the fittingly driving of the wobble plate 330 and the two-way piston 200. Specifically, the two-way piston 200 includes a plurality of socket portions 210, each socket portion 210 being a hemispherical concave surface respectively provided along an axial direction A-A of the two-way piston 200 and the front and rear walls 221 of the slot 220 at a middle portion of the two-way piston 200. Further, two hemispherical sliding shoes 230 are respectively provided in the socket portions 210 for interacting with the first peripheral portion 334 and the second peripheral portion 335 of the wobble plate 330. Conventionally, a flat part of the hemispherical sliding shoe 230 is defined as a flat portion 231, and a projected surface part is defined as a convex portion 232; and the sliding shoe 230 may serve as a pivot bearing part between the peripheral portion of the wobble plate 330 and the socket portion 210 of the two-way piston 200. Thus, the wobble plate 330 may be spherically hinged to the two-way piston 200 via the socket portion 210 and the hemispherical sliding shoe 230.

Of course, it will be easily understood that, the wobble plate 330 may also drive the two-way piston 200 into reciprocating motion by other conventional fitting means, for example, using a pin structure to implement a fitting connection between the wobble plate 330 and the two-way piston 200.

As such, when the peripheral portion of the wobble plate 330 slidingly passes between two flat portions of a pair of sliding shoes 230, and the sliding shoe 230 is provided between the two-way piston 200 and the wobble plate 330, the two-way piston 200, the sliding shoe 230, and the peripheral portion wobble plate 330 collectively form a universal bearing structure, and in the present embodiment, the universal bearing structure is a sliding shoe universal joint structure.

In the embodiments as shown in FIGS. 1 to 3, when the drive shaft 310 of the wobble plate compressor rotates, the rotor 320 will rotate with the rotation of the drive shaft 310; due to the actions of the first bearing 340, the second bearing 350, and the third bearing 360, the wobble plate 330 performs wobbling motion but does not rotate along with the rotation of the drive shaft; due to the actions of the sliding shoe universal joint, the flat portion of the sliding shoe 230 and the peripheral portion of the wobble plate 330 move up and down with respect to each other in a diameter direction relative to wobble plate 330; and the two-way piston 200 performs forward and rearward reciprocating motion under the constraints of the corresponding cylinder bore in the cylinder block 100. Since there is no constraint on the rotation of the wobble plate 330, when the drive shaft 310 rotates, the wobble plate 330 may also disproportionately and slowly rotate along with the rotation of the drive shaft 310 under the actions of friction forces of the first bearing 340, the second bearing 350, and the third bearing 360, and such rotation will greatly reduce wear between surfaces of the peripheral portion of the wobble plate 330 and the flat portion of the sliding shoe 230.

Further, with reference to FIGS. 2 and 3, a force F1 coming from the two-way piston 200 and acting on the sliding shoe 230 is transmitted to the first bearing 340 and the second bearing 350 via the wobble plate 330, but the force bearing point of F1 falls out of the inner ring contact surfaces of the first bearing 340 and the second bearing 350. In order to prevent such circumstances from happening, a force F2 directed to the centers of the first bearing 340 and the second bearing 350 is applied thereto in advance via tightening of the nut 312, such that the magnitude, direction and force bearing point of a resultant force F of F1 and F2 is changed. This makes it possible to optimally comply with the design and use requirements of the bearings, and may greatly lengthen the service lives of the bearings.

Figure 4:
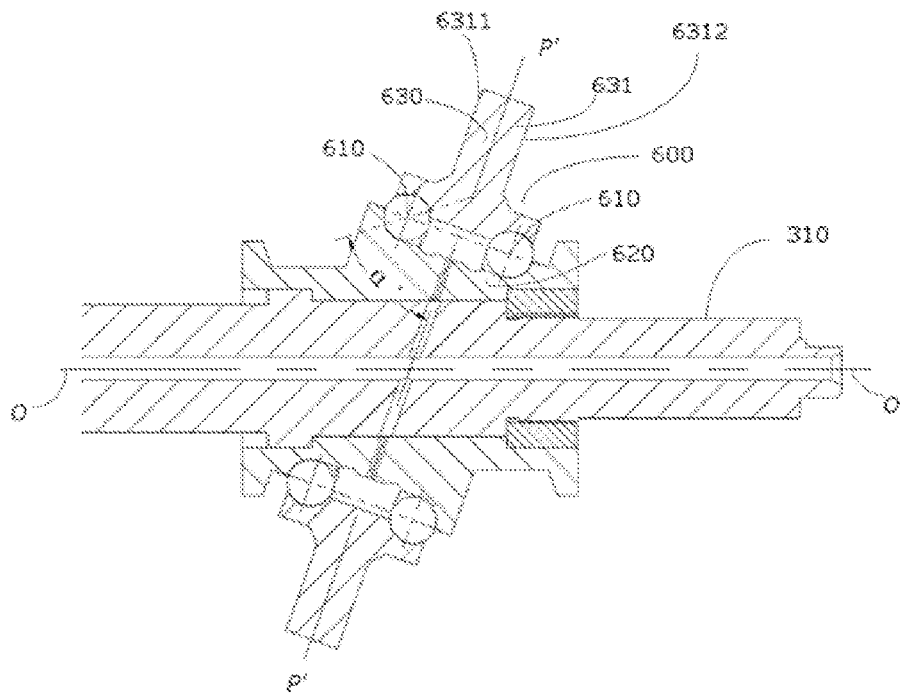
FIG. 4 is a sectional view of another embodiment of the two-way wobble plate compressor of the present invention.

In FIG. 4, an illustrative view of another embodiment of the two-way wobble plate compressor of the present invention is shown. In this type of embodiments, similarly, such type of two-way wobble plate compressor may also include a cylinder block (not shown), the cylinder block having a cylinder bore; and include a two-way piston (not shown) capable of reciprocating within the cylinder bore of the cylinder block, and a drive shaft 310 driving the two-way piston.

Particularly, in the embodiment as shown in FIG. 4, the two-way wobble plate compressor further includes a bearing unit 600, the bearing unit 600 including a plurality of contact balls 610 and an inner ring 620 and an outer ring 630 fitting with the plurality of contact balls 610, and bearing unit 600 having a central plane P'-P' angled to a perpendicular plane O-O of the drive shaft 310, wherein the drive shaft 310 is sleeved in the inner ring 620 of the bearing unit 600, and is fixed to the inner ring 620; the outer ring 630 of the bearing unit 600 is coupled to the two-way piston, when the drive shaft 310 rotates, the two-way piston is driven via the bearing unit 600 to perform reciprocating motion. Similar to the above described embodiment, the inner ring 620 may be fixed to the drive shaft 310 via a nut.

Actually, as compared with the above described embodiment, the inner ring 620 of the bearing unit 600 may simultaneously have the function of the rotor in the above described embodiment, while the outer ring 630 of the bearing unit 600 may simultaneously have the function of the wobble plate in the above described embodiment. Thus, the two-way wobble plate compressor in this embodiment has a compact structure, suitable for application in commercial high power compressors.

In this embodiment, the bearing unit 600 is of a double row angular contact ball bearing unit type. Preferably, a bearing contact angle α' of the bearing unit 600 is greater than 45°.

Preferably, a manner of coupling between the outer ring 630 of the bearing unit 600 and the two-way piston may adopt the above described sliding shoe type coupling. Specifically, also with reference to FIG. 4, the outer ring 630 includes a coupling end 631, the coupling end 631 including a first peripheral portion 6311 and a second peripheral portion 6322; correspondingly, the two-way piston (not shown) includes two socket portions, two hemispherical sliding shoes are provided within the two socket portions for interacting with the first peripheral portion 6311 and the second peripheral portion 6322 of the coupling end 631, respectively.

Figure 5:
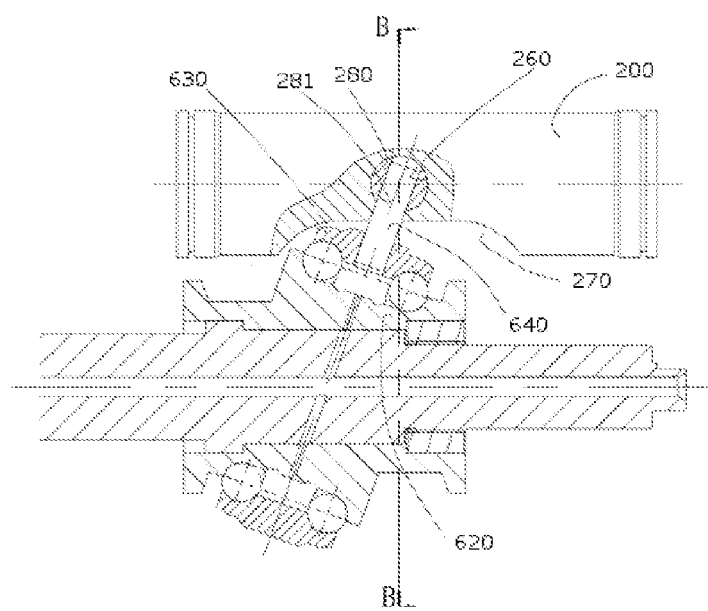
FIG. 5 is a sectional view of a third embodiment of the two-way wobble plate compressor of the present invention.
Figure 6:
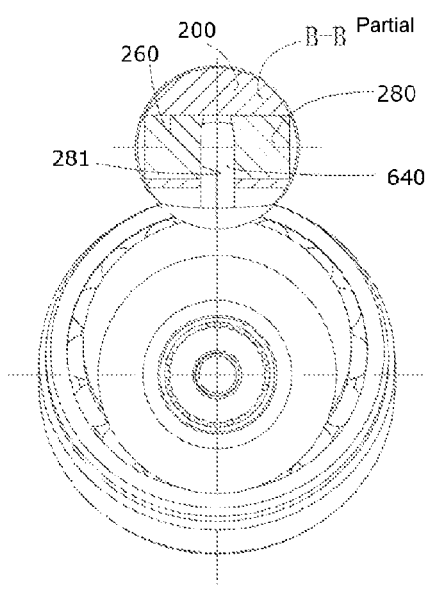
FIG. 6 is a partial front view taken along line B-B in FIG. 5.

In addition, as shown in FIGS. 5 and 6, the outer ring 630 of the bearing unit 600 and the two-way piston 200 may also coupled via a pin-type coupling. Specifically, the outer ring 630 of the bearing unit 600 is fixedly connected with a drive pin 640; at its center, the two-way piston 200 is provided with a cylindrical hole 260, an axis of the cylindrical hole 260 being perpendicular to and intersecting with an axis of the two-way piston 200, and cylindrical hole 260 being provided with a slot 270 fitting with the drive pin 640; further, a piston pin 280 is provided in the cylindrical hole 260, the piston pin 280 having a cross hole 281, the piston pin 280 passing through the slot 270 to insert into the cross hole 281. As such, the two-way piston 200, the piston pin 280, and the drive pin 640 collectively form a pin universal joint structure.

It will be easily understood that the present invention is not limited to the specific examples given by the above described embodiments, for example, the above described sliding shoe universal joint structure and pin universal joint structure may be interchangeable. Any combinations and readily conceivable variants of these particular embodiments shall fall into the scope of protection of the present invention.

The invention claimed is:

1. A two-way wobble plate compressor, comprising:
 a cylinder block, the cylinder block having a cylinder bore;
 a two-way piston capable of reciprocating within the cylinder bore of the cylinder block;
 a drive shaft driving the two-way piston;
 a bearing unit, the bearing unit including a plurality of contact balls and an inner ring and an outer ring fitting with the plurality of contact balls, and the bearing unit having a central plane angled to a perpendicular plane of the drive shaft, wherein
 said drive shaft is sleeved in the inner ring of the bearing unit, and is fixed to the inner ring;
 the outer ring of said bearing unit is coupled to the two-way piston, and when the drive shaft rotates, the two-way piston is driven via the bearing unit to perform reciprocating motion;
 wherein said bearing unit is a double row angular contact ball bearing unit, and
 a bearing contact angle a' of said bearing unit is greater than 45°.

2. The two-way wobble plate compressor according to claim 1, wherein
 said outer ring includes a coupling end, said coupling end including a first peripheral portion and a second peripheral portion; and
 said two-way piston includes two socket portions, wherein two hemispherical sliding shoes are provided within the two socket portions for interacting with the first peripheral portion and the second peripheral portion of said coupling end, respectively.

3. The two-way wobble plate compressor according to claim 1, wherein said outer ring is fixedly connected with a drive pin;
 a center of said two-way piston is provided with a cylindrical hole, an axis of the cylindrical hole being perpendicular to and intersecting with an axis of the two-way piston, and the cylindrical hole being provided with a slot fitting with the drive pin; and
 a piston pin is provided in the cylindrical hole, the piston pin having a cross hole, and the piston pin passing through the slot to insert into the cross hole.

4. The two-way wobble plate compressor according to claim 1, wherein said inner ring is fastened to said drive shaft via a nut.

* * * * *